April 17, 1934.　　O. W. SJOGREN ET AL　　1,955,257
REVOLVING DRAG SCRAPER
Filed Nov. 16, 1932　　3 Sheets-Sheet 2
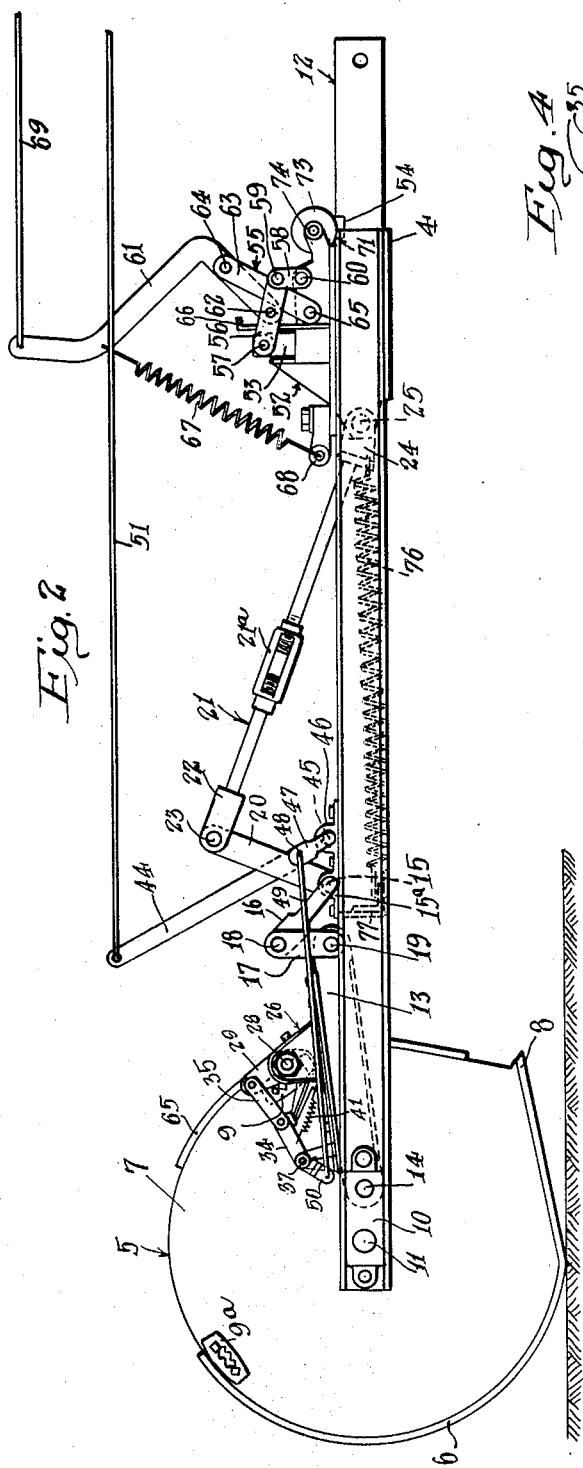
Inventors
Oscar W. Sjogren
Jesse A. Vaughn
By Lyon & Lyon
Attorneys April 17, 1934.    O. W. SJOGREN ET AL    1,955,257
REVOLVING DRAG SCRAPER
Filed Nov. 16, 1932    3 Sheets-Sheet 3
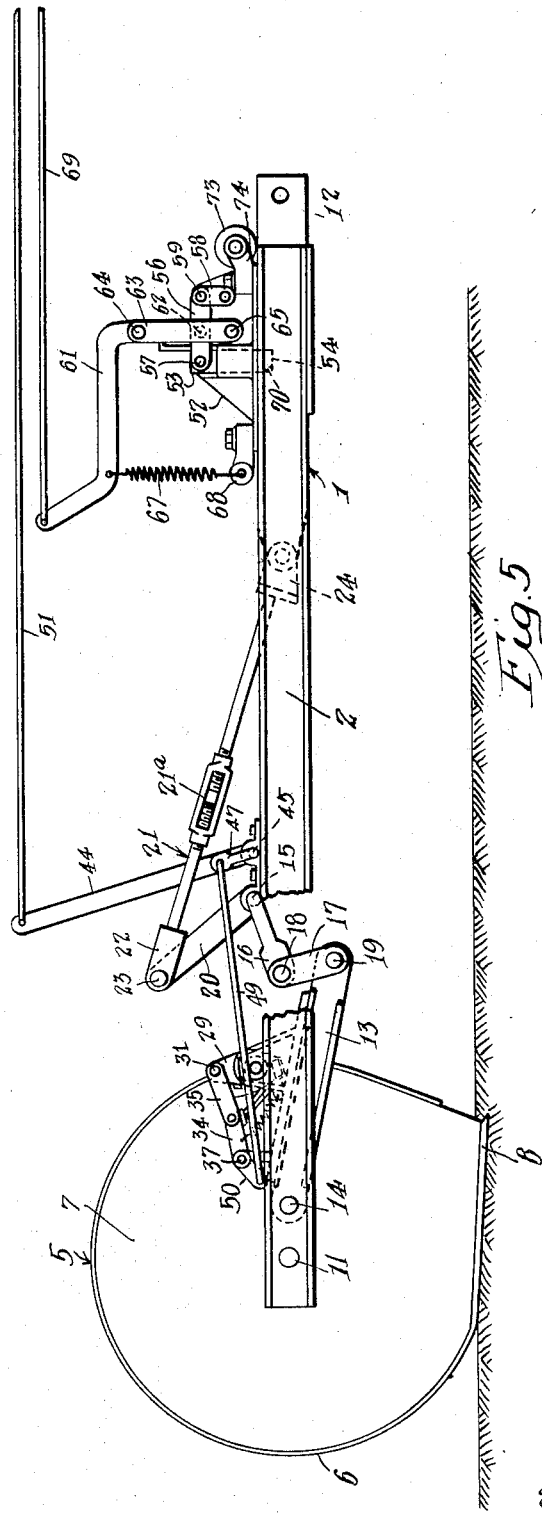
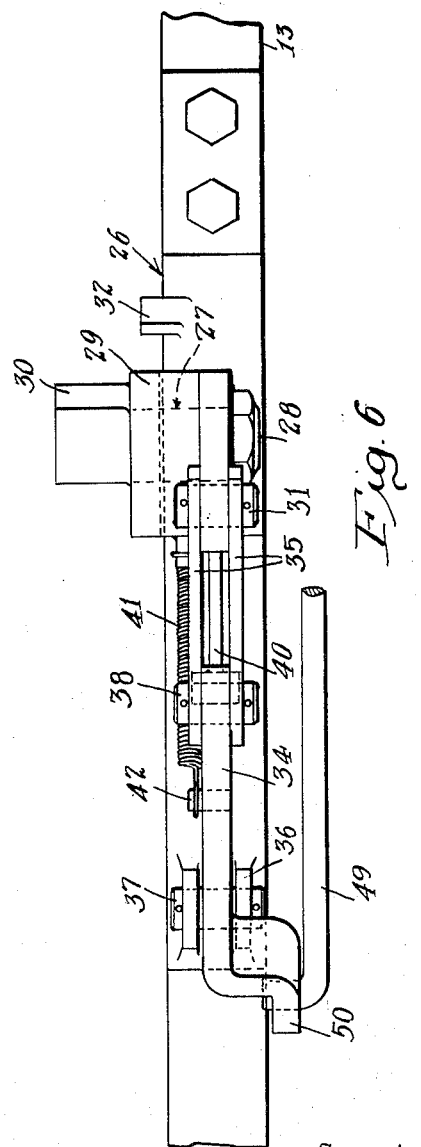
Inventors
Oscar W. Sjogren
Jesse A. Vaughn
By Lyon & Lyon
Attorneys Patented Apr. 17, 1934

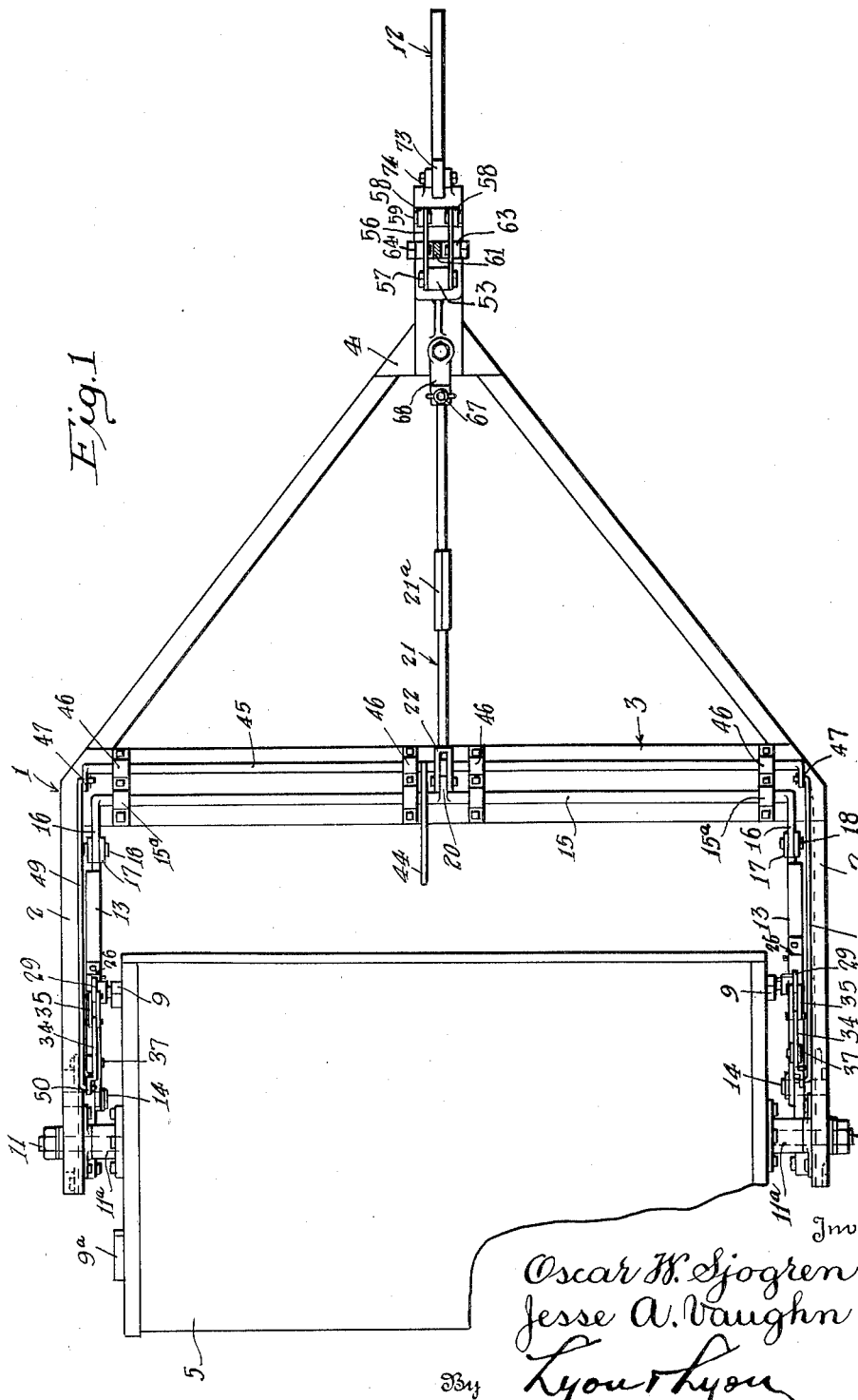

1,955,257

UNITED STATES PATENT OFFICE 1,955,257

REVOLVING DRAG SCRAPER

Oscar W. Sjogren, Huntington Park, and Jesse A. Vaughn, Los Angeles, Calif., assignors to Killefer Manufacturing Company, Ltd., Los Angeles, Calif., a corporation of California Application November 16, 1932, Serial No. 642,896

14 Claims. (Cl. 37—140)

This invention relates to a revolving drag scraper provided with a sliding draw bar operable by the draft force for actuating the scraper bowl from its loading to its carrying position.

It is an object of this invention to provide a revolving drag scraper with a sliding draw bar operable for actuating a pair of lifting arms for rotating the cutting edge of the scraper bowl from a cutting to a carrying position.

A further object is to provide a release means for the draw-bar latch whereby upon releasing the draw-bar latch the draft force may act through the sliding draw-bar to elevate the lifting arms for rotating the scraper bowl from a cutting to a carrying position.

A further object is to provide a toggle locking and releasing means for the draw-bar latch whereby the latch will be locked in its engaging position with the sliding draw-bar to prevent the pull of the draw-bar or the vibration of the implement from causing the latch from working out of locking engagement.

A further object is to provide means which will positively lock the latch means in locking engagement with the sliding draw-bar and which means may be easily actuated to withdraw the latch from locking engagement with the sliding draw-bar.

A further object is to provide a spring means for returning the sliding draw-bar from its extended to its retracted position when the load carried by the bowl has been discharged.

A further object is to provide a scraper bowl control which will permit the bowl to float in the carrying position.

A further object is to provide each of the lifting arms with a removable bowl latch means operable for engaging suitable stops carried by the scraper bowl for locking the bowl against rotation.

A further object is to provide means for releasing the bowl latches to free the bowl for dumping the load accumulated therein.

A further object is to provide scraper bowl latches which unless locked against movement will be moved by the thrust of the bowl stops from the locking to the releasing position and to provide means for releasably retaining the bowl latches in the locking position.

A further object is to provide each bowl latch with a toggle lock and means for disrupting said toggle lock for releasing the bowl latch from its locking position and thereby permitting the scraper bowl to rotate.

A further object is to provide a spring means for returning the bowl latch to the locking position and for re-establishing the toggle locking effect.

A further object is to provide means for adjusting the scraper bowl control means whereby the cutting angle of the scraper bowl may be adjusted relative to the sliding draw-bar.

Other objects and advantages of the invention will become apparent as the nature of the same is more fully understood from the following description and accompanying drawings, wherein is set forth what is now considered to be a preferred embodiment. It should be understood, however, that this particular embodiment of the invention is chosen principally for the purpose of exemplification and that variations therefrom in details of construction or arrangement of parts may accordingly be affected and yet remain within the spirit and scope of the invention as the same is set forth in the appended claims.

In the drawings

Figure 1 illustrates a plan view of the invention.

Figure 2 illustrates a side view of the implement in carrying position.

Figure 3 illustrates an enlarged fragmented view of the lifting arms and the bowl latch mechanism.

Figure 4 illustrates an end view of Figure 3.

Figure 5 illustrates a side view similar to Figure 2 but differing therefrom by showing the implement in cutting or scraping position and by also having part of the frame broken away to more clearly show the scraper control mechanism.

Figure 6 illustrates a plan view of Figure 3.

The preferred embodiment of the invention illustrated in the drawings includes broadly a frame, a scraper bowl of usual design and a control means operatively organized in the frame for controlling the operation of the scraper bowl.

The scraper frame 1 may be more or less of the usual conventional design which may briefly include the side members 2 braced by a transverse cross-member 3 and joined at the forward end by gusset plates 4.

The scraper bowl 5 may also be of conventional design and may briefly include a bottom and back plate 6 connecting suitable end members 7 and a cutting blade 8. Each end member may be provided with adjustable stops. The first stop 9 may be operable for retaining the bowl in either the cutting or carrying position while the second stop 9a is operable to retain the bowl in the spreading position.

The scraper bowl 5 may be journaled upon the rear of frame 1 by means of frame bearings 10 journally supporting the stub shafts 11, which shafts may be suitably mounted in the scraper bowl flanges 11a. The scraper bowl flanges may be suitably bolted or riveted to the end members 7.

The scraper control means may roughly be divided into three separate groups of instrumentalities, namely, the bowl rotating means, the scraper bowl locking means, and the locking means for the sliding draw-bar.

The scraper control means for rotating the bowl from the cutting to the carrying position and vice versa may include a sliding draw-bar 12 slidably mounted in the forward end of frame 1 between the gusset plates 4.

The forward end of the draw bar may be provided with means for coupling the implement to a draft means (not shown), such as a tractor.

A lifting arm 13 may be journaled upon an extended portion of each frame bearing 10 by means of the pivot pin 14 and extend forwardly therefrom to a point some distance in front of the scraper bowl.

The forward or free end of each lifting arm may be operatively connected to the rear end of the sliding draw-bar by any suitable means. The means for connecting the free end of each lifting arm with the sliding draw-bar may include a transverse lifting shaft 15 rotatively mounted in journals 15a mounted upon the frame cross member 3 and a lifting crank arm 16 may be suitably mounted upon or formed integral with each end of the lifting shaft. The outer end of each crank arm may be pivotally connected to the forward end of the adjacent lifting arm 13 by means of links 17. The links 17 may be pivotally connected to the crank arms by pivot pins 18, while the opposite ends of the links may be pivotally connected to the lifting arms by the pivot pins 19. Intermediate the ends thereof the lifting shaft may be provided with a lifting lever 20.

The free end of the lifting lever 20 may be connected to the rear end of the sliding draw-bar by the adjustable rod 21. The adjustable rod may be pivotally connected to the free end of the lifting lever by means of clevis 22 and pivot pin 23, while the opposite end of the adjustable rod may be pivotally connected to the sliding draw-bar by means of clevis 24 and pivot pin 25.

The rod 21 may be formed of two separate rods and joined together by means of a turnbuckle 21a. One rod end may be screw-threaded into the turnbuckle with a righthand thread while the other rod end may be screw-threaded into the turnbuckle with a lefthand thread, whereby, by turning the turnbuckle while the rods are held stationary, the adjustable rod 21 will be lengthened or shortened, thereby regulating the cutting edge of the scraper bowl with relation to the draw-bar.

By so connecting the forward ends of the lifting arm 13 to the rear end of the sliding draw-bar 12, an outward or forward movement of the draw-bar will be communicated through the control mechanism to elevate the forward ends of the lifting arms while a rearward movement of the draw-bar will cause the outer ends of the lifting arms to be lowered.

The second group of instrumentalities may include the releasable connection between the elevating arms and the scraper bowl, which may include a bearing bracket 26 suitably mounted upon each of the lifting arms 13. Each bearing bracket 26 may be provided with a transverse bore 27 to form a journal for the pin 28 of the bowl latch 29.

The pin 28 may be formed integral with or suitably secured to the bowl latch. The bowl latch may be in the form of a lever and extend above and below the journal pin 28. The bowl latch lever may be provided adjacent its lower end with a transversely projecting lug 30, while adjacent the upper end thereof a transverse bore may be provided to receive the pivot pin 31.

When the bowl latch is in the position illustrated most clearly in Fig. 3 the projecting lug 30 is in position to be engaged by the bowl stops 9 and 9a. The projecting lug 30 is positioned below the center of rotation of the bowl latch so that the normal thrust of either of the bowl stops 9 or 9a against the lug will cause the bowl latch to swing in a counter clockwise direction as viewed in Fig. 3 until the lug 30 has swung clear of the bowl stops. In other words, by this arrangement the bowl latch is self-releasing.

The bracket 26 may be provided with a stop boss 32 to limit the extent to which the bowl latch 29 may be swung under the influence of the bowl stops acting against the stop lug 30. The stop boss 32 is positioned to permit the bowl latch to swing until the lug 30 thereof has moved out of engagement with either of the bowl stops and to thereafter arrest further swinging of the latch lever.

Any suitable means may be provided for locking or retaining the bowl latch lever 29 in locking position, such as the toggle lock 33. The toggel lock may be formed between the crank arm 34 and the links 35. The crank arm 34 may be suitably journaled in the standard 36 by means of the shaft 37. The shaft 37 may be formed integral with or suitably secured to the crank arm 34 so that by rotating the shaft the crank arm will also be rotated. The outer or free end of the crank arm 34 may be provided with a transverse bore to receive a pivot pin 38.

Links 35 pivotally connect the bowl latch lever 29 and the crank arm 34 by means of the pivot pins 31 and 38 and are secured thereon by cotter keys 39.

The toggle lock may be formed by allowing the ends of the crank arm 34 and the links 35 which are connected by the pivot pin 38, to pass slightly beyond the center line passing through the center of the crank arm shaft 37 and the pivot pin 31, and for this purpose a stop 40 may be provided.

It is desirable to provide a spring 41 for yieldingly retaining the crank arm 34 and links 35 in contact with the arm 40 in order to maintain the toggle lock. The spring may act between the crank arm 34 as at 42 and the bracket 26 as at 43.

Means may be provided for disrupting the toggle lock, which means may include a releasing lever 44 suitably mounted upon the transverse shaft 45, which shaft may be journaled in bearings 46 carried by the frame cross member 3. Each end of shaft 45 may be provided with a suitable crank arm 47. The free end of each crank arm 47 may be provided with transverse bore 48 to receive one end of the connecting rod 49, while the opposite end of the connecting rod may be pivotally connected to the free end of the crank arm 50, which crank arm 50 may be suitably secured to one end of the shaft 37 of the toggle crank arm 34.

By disrupting the toggle lock the bowl latch 29 is free to be swung by the force of the bowl stop to release the bowl. Thus the operator to release the scraper bowl need only disrupt the toggle lock which may be easily accomplished by pulling upon the rope 51 to swing the release lever 44. The motion thus given to the release lever is transmitted through shaft 45, crank arms 47, connecting rod 49, crank arm 50 to rotate shaft 37 and thereby the toggle crank arm 34 is rotated to lift the links 35 from arm 40 to the other side of the center line passing through the centers of shaft 37 and pivot pin 31, thus disrupting the toggle lock whereupon the bowl latch is released and may be swung due to the thrust of the bowl stops against the lugs 30 to automatically release the scraper bowl for rotation.

Immediately after the bowl stops have been released, the springs 41 act to return the bowl latch lever 29 and the toggle lock to their initial locking positions, so that upon rotation of the scraper bowl the spreading stops 9a will engage the stop lugs 30 and retain the bowl in spreading position. The bowl may be released from the spreading position by again disrupting the toggle lock 33.

Means may be provided for locking the scraper control and thereby positively locking the bowl in the cutting position. The preferred means for locking the scraper control may include a locking means for the sliding draw-bar 12, which locking means may include a bracket 52 suitably mounted upon the forward end of the implement frame directly over the sliding draw-bar, a bolt 53 slidably mounted in said bracket and adapted to engage a notch 54 formed in the upper surface of the draw-bar.

It is desirable to provide means for locking the sliding bolt 53 in engagement with notch 54 to prevent the bolt from working out of locking engagement with the notch due to the draft force acting through the sliding draw-bar 12 or due to vibration of the implement, and which locking means may be made use of to withdraw the bolt when it is desired to release the sliding draw-bar.

One form of such locking and releasing means for the sliding bolt may include a toggle lock 55 formed by and between the following arrangement of links and levers. First, a pair of lifting links 56 may be pivotally connected at one end to the upper end of the sliding bolt as by the pivot pin 57 while at their opposite ends may be swingably connected to bracket 52 by means of a pair of swing links 58, which links are pivotally connected at their upper end to the lifting links by means of pivot pin 59 and at their lower ends are pivotally connected to bracket 52 by means of pivot pin 60. A releasing lever 61 may be positioned between the lifting links and pivotally connected thereto by means of the pivot pin 62 and pivotally and swingably connected to bracket 52 by means of a pair of fulcrum links 63. The fulcrum links 63 may be pivotally connected to the releasing lever at a point spaced from pivot 62 by means of the pivot pin 64 and pivotally connected to bracket 52 by a pivot pin 65. The bracket 52 may be provided with a stop lug 66 for stopping the releasing in locking position, as will be observed from Fig. 5. A spring 67 may be provided for resiliently retaining the releasing lever and thus the toggle lock in the locking position as illustrated in Fig. 5. The spring may act between the releasing lever and a suitable bracket 68 mounted upon the main bracket 52. In Fig. 5 the sliding bolt locking means is illustrated in position to retain or lock the sliding bolt 53 in engagement with the sliding draw-bar notch 54. With the parts in this position, any tendency for the bolt 53 to move up and out of the notch will be effectively resisted by the inability of the lifting links 56 to move the end of the releasing lever 61, which in this position is directly in alignment with the fulcrum links 63. In Fig. 2 the locking means for the sliding bolt 53 is illustrated in the released position. In order to raise the sliding bolt free of notch 54, the operator need only swing the releasing lever by means of rope 69 until the toggle lock is disrupted, whereupon the thrust of the draw-bar against the bolt will cause a complete disengagement of the bolt from the locking notch. In some instances it may be desirable to taper the engaging face of the bolt as at 70 and to correspondingly taper the notch as at 71. When the sliding draw-bar is retracted, spring 67 will function to reestablish the toggle lock.

In order to reduce the friction of the sliding draw-bar, an anti-friction roller 73 may be suitably journaled upon the bearing bracket 74.

The operation of the implement may be as follows:

Assuming the implement to be locked in the cutting or loading position as illustrated in Fig. 5, a tractor (not shown) may be suitably coupled to the forward end of the sliding draw-bar and the implement pulled forwardly until the desired load has accumulated in the scraper bowl, whereupon the operator, by pulling upon rope 69, may release the sliding draw-bar lock by swinging the releasing lever 61 forwardly to disrupt toggle lock 55, thereby causing the withdrawal of the sliding bolt 53 from the locking notch 54, as previously described. Upon the release of the sliding draw-bar lock, and due to the resistance of the loaded scraper, the tractor will pull the draw-bar out to its extended position. The forward movement of the draw-bar with relation to the implement will cause the lifting arms 13 to be elevated as previously described. As the bowl stops 9 are engaged by the bowl latch lever lugs 30 carried by the lifting arms 13, the scraper bowl will be thus rotated in a counter-clockwise direction, as viewed in Fig. 5 from the cutting position of Fig. 5 to the carrying position of Fig. 2.

Upon arriving at the dumping locality, the operator may, by pulling upon rope 51, release the bowl from the bowl stops as previously explained, thus permitting the bowl to roll as a wheel until the spreading stops 9a engage the bowl latch lever lugs 30, whereupon the bowl will be maintained in the spreading position to spread the load in a thin layer. However, should it be desired to deposit the load in a pile, the release lever 44 may be held in the forward position by means of rope 51 until the spreading stops 9a have passed by the bowl latch lever lugs 30, thus permitting the scraper bowl to make a complete revolution, and thereby depositing the scraper load in a pile.

When the load is dumped, the sliding draw-bar will return to its retracted position, whereupon the sliding bolt 53, due to the action of spring 67, will return into locking engagement with the draw-bar notch 54. The implement is returned to the loading zone and the operation repeated. It is preferable during the return journey that the bowl be retained in the spreading position so that the bowl may ride on the runners 65 positioned at each end of the bowl. When the loading zone is reached, the bowl latch may be actuated again to release the bowl spreading stops 9a, so that the bowl may roll until the loading stops 9 engage the stop lugs 30. The bowl is now ready for another load.

It is to be understood that if desired a second notch may be located in the sliding draw-bar for locking the scraper bowl in the carrying position.

When operating the implement in some soil conditions, it is desirable to provide one or more springs 76 for assisting the return of the draw-bar to its retracted position. The spring may act between the clevis 24 and the bracket 77 carried by the frame cross member 3.

Having fully described the invention, it is to be understood that it is not to be limited to the details herein set forth but the invention is of the full scope of the appended claims.

We claim:

1. A scraper including a frame, a pair of lifting arms pivotally mounted upon opposite sides of the frame, means including a sliding drawbar for actuating said lifting arms, a scraper bowl rotatively mounted in the frame at a point spaced from the pivoted mounting of said lifting arms, stops carried by said bowl, a swinging latch means operatively mounted upon said lifting arms and positioned to be engaged and swung into disengaging position by said bowl stops, means including a toggle lock for retaining said swinging latch means in locking position, and means for disrupting said toggle lock to release said swinging latch means so that said latch means may be swung into the disengaging position by said bowl stops.

2. A scraper including a frame, a pair of lifting arms pivotally mounted upon opposite sides of the frame, means including a sliding drawbar for actuating said lifting arms, a scraper bowl rotatively mounted in the frame at a point spaced from the pivotal mounting of said lifting arms, stops carried by said bowl, a swinging latch means operatively mounted upon said lifting arms and positioned to be engaged and swung into disengaging position by said bowl stops, means including a toggle lock for retaining said swinging latch in locking position, a spring means operative for yieldingly urging said toggle lock into locking relation, and means for disrupting said toggle to release said swinging latch means so that said latch means may be swung into the disengaging position by said bowl stop.

3. A scraper including a frame, a pair of lifting arms pivotally mounted upon opposite sides of the frame, means including a sliding drawbar for actuating said lifting arms, a scraper bowl rotatively mounted in the frame at a point spaced from the pivotal mounting of said lifting arms, stops carried by said bowl, a swinging latch means operatively mounted upon said lifting arms and positioned to be engaged and swung into disengaging position by said bowl stops, means including a toggle lock for retaining said swinging latch means in locking position, means for disrupting said toggle lock for releasing said swinging latch means so that said latch means may be swung into the disengaging position by said bowl stops, and means for returning said swinging latch into engaging position and for re-establishing said toggle lock.

4. A scraper including a frame, a pair of lifting arms pivotally mounted upon opposite sides of the frame, means including a sliding drawbar for actuating said lifting arms, a locking means for locking the sliding drawbar in its retracted position, means for releasing said locking means, a scraper bowl rotatively journaled in the frame at a point spaced from the pivotal mounting of said lifting arms, stops carried by said bowl, a latch means operatively mounted upon said lifting arms and positioned to be engaged and moved into the disengaging position by said bowl stops, means including a toggle lock for retaining the latch means in locking position, and means for disrupting said toggle lock for releasing the latch means so that said latch means may be moved into the disengaging position by said bowl stops.

5. A scraper including a frame, a pair of lifting arms pivotally mounted upon opposite sides of the frame, means including a sliding drawbar for actuating said lifting arms, a spring means for yieldingly retaining the sliding drawbar in the retracted position, a locking means for locking the sliding drawbar in its retracted position, means operable for releasing said locking means, a scraper bowl rotatively journaled in the frame at a point spaced from the pivoted mounting of said lifting arms, stops carried by said bowl, a latch means operatively mounted upon said lifting arms and positioned to be engaged and moved into the disengaging position by said bowl stops, means including a toggle lock for retaining the latch means in locking position, and means for disrupting said toggle lock for releasing the latch means.

6. A latch means for a scraper having a sliding draw-bar including, a sliding draw-bar having a locking notch, a sliding bolt arranged to engage in said notch, a toggle lock operative for locking the sliding bolt in locking engagement with said notch, and means for disrupting the toggle lock and operative for lifting said bolt out of engagement with said notch.

7. A latch means for a scraper having a sliding draw-bar including, a sliding draw-bar having a locking notch, a sliding bolt arranged to engage in said notch, a toggle lock operative for locking the sliding bolt in locking engagement with said notch, means for disrupting the toggle lock and operative for lifting said bolt out of engagement with said notch, and a spring means operative for returning the bolt and toggle to their initial locking positions.

8. A latch means for the sliding draw-bar of a scraper including, a sliding draw-bar having a locking notch, the engaging face of said notch being suitably tapered, a bolt arranged to engage in said notch and having an engaging face tapered to substantially coincide with the taper of said notch, a toggle lock operative for locking the bolt in locking engagement with said notch, and means for disrupting the toggle lock whereby the thrust against the tapered surfaces may act to automatically disengage the bolt from the notch.

9. A latch means for the sliding draw-bar of a scraper including a sliding draw-bar having a locking notch, the engaging face of said notch being suitably tapered, a bolt arranged to engage in said notch and having an engaging face tapered to substantially coincide with the taper of said notch, a toggle lock operative for locking the bolt in locking engagement with said notch, means for disrupting the toggle lock whereby the thrust against the tapered surfaces may act to automatically disengage the bolt from the notch, and a spring means operative for returning the bolt and toggle to their initial locking positions.

10. A latch means for a sliding draw-bar of a scraper including a scraper frame, a draw-bar slidably mounted therein, said draw-bar having a locking notch, a bolt slidably mounted upon said frame and arranged to engage in said notch, a wall of lifting links pivotally connected to said bolt and swingably connected to said frame, a pair of fulcrum links pivotally mounted to said frame, and an actuating lever pivotally joining said lift and fulcrum links.

11. A latch means for a sliding draw-bar of a scraper including a scraper frame, a draw-bar slidably mounted therein, said draw-bar having a locking notch, a bolt slidably mounted upon said frame and arranged to engage in said notch, a pair of lifting links pivotally connected to said bolt and swingably connected to said frame, a pair of fulcrum links pivotally mounted to said frame, an actuating lever pivotally joining said lift and fulcrum links, and a stop means for said lever.

12. A latch means for a sliding draw-bar of a scraper including a scraper frame, a draw-bar slidably mounted therein, said draw-bar having a locking notch, a bolt slidably mounted upon said frame and arranged to engage in said notch, a pair of lifting links pivotally connected to said bolt and swingably connected to said frame, a pair of fulcrum links pivotally mounted to said frame, an actuating lever pivotally joining said lift and fulcrum links, a stop means for said lever, and a spring means acting between said lever and frame for yieldingly retaining said lever in toggle-locking position.

13. A scraper including a frame, a pair of lifting arms pivotally mounted upon opposite sides of the frame, means operable by the draft force for actuating said lifting arms, a scraper bowl rotatively mounted in the frame, stops carried by said bowl, a swinging latch means operatively mounted upon said lifting arms and positioned to be engaged and swung into disengaging position by said bowl stops, means including a toggle lock for retaining said swinging latch means in locking position, and means for disrupting said toggle lock for releasing said swinging latch means so that said latch means may be swung into the disengaging position by said bowl stops.

14. A scraper including a frame, a pair of lifting arms pivotally mounted upon opposite sides of the frame, means operable by the draft force for actuating said lifting arms, a scraper bowl rotatively mounted in the frame, stops carried by said bowl, a swinging latch means operatively mounted upon each of said lifting arms and positioned to be engaged and swung into disengaging position by said bowl stops, means including a toggle lock for retaining said swinging latch means in locking position, means for disrupting said toggle lock for releasing said swinging latch means so that said latch means may be swung into the disengaging position by said bowl stops, and means for returning said swinging latch means into engaging position and for re-establishing said toggle lock.

OSCAR W. SJOGREN.
JESSE A. VAUGHN.

CERTIFICATE OF CORRECTION.

Patent No. 1,955,257.                                                    April 17, 1934.

OSCAR W. SJOGREN, ET AL.

It is hereby certified that the name of the assignee in the above numbered patent was erroneously described and specified as "Killefer Manufacturing Company, Ltd." whereas said name should have been described and specified as Killefer Manufacturing Corporation, Ltd., as shown by the records of assignments in this office; and that the said Letters Patent should be read with this correction therein that the same may conform to the record of the case in the Patent Office.

Signed and sealed this 19th day of June, A. D. 1934.

Bryan M. Battey (Seal)                                                    Acting Commissioner of Patents.